United States Patent [19]

Botzler

[11] 4,387,809
[45] Jun. 14, 1983

[54] MULTI-COMPARTMENT COMBINATION PACKAGE AND STIRRER DEVICE

[76] Inventor: Paul C. Botzler, 11548 Glenn Arm Rd., Glen Arm, Md. 21057

[21] Appl. No.: 259,576

[22] Filed: May 1, 1981

[51] Int. Cl.³ .................. B65D 77/08; B65D 25/04; B67D 5/56
[52] U.S. Cl. .................... 206/526; 206/216; 206/219; 206/568; 222/129; 426/135
[58] Field of Search ............... 206/526, 216, 219, 568, 206/630, 634; 426/85, 135; 220/20; 222/129, 142.1, 544; 99/323; 366/343

[56] References Cited

U.S. PATENT DOCUMENTS

| 209,103 | 10/1867 | Langewis et al. | 285/55 |
| 309,905 | 12/1884 | Wells | 206/568 |
| 362,727 | 5/1887 | Devine | 426/120 |
| 1,254,115 | 1/1918 | Brand | 426/85 X |
| 2,215,705 | 9/1940 | Lenz | 206/634 X |
| 2,722,311 | 11/1955 | Morrison | 206/216 |
| 2,901,357 | 8/1959 | Epstein | 426/85 |
| 3,034,905 | 5/1962 | Weinstraub et al. | 426/394 |
| 3,154,418 | 10/1964 | Lovell et al. | 206/568 X |
| 3,485,416 | 12/1969 | Fohriman | 222/142.1 |
| 3,559,872 | 2/1971 | Riboud | 206/630 |
| 3,682,366 | 8/1972 | Chung | 206/630 X |
| 3,744,625 | 7/1973 | Chin | 206/47 A |
| 4,134,494 | 1/1979 | Wong | 206/216 |
| 4,215,628 | 8/1980 | Dodd, Jr. | 99/323 |

FOREIGN PATENT DOCUMENTS

| 292263 | 6/1916 | Fed. Rep. of Germany | 222/129 |
| 2635417 | 2/1978 | Fed. Rep. of Germany | 426/85 |
| 472051 | 6/1952 | Italy | 222/544 |
| 573848 | 3/1976 | Switzerland | 206/216 |

Primary Examiner—William T. Dixson, Jr.
Assistant Examiner—Brenda J. Ehrhardt
Attorney, Agent, or Firm—Richard M. McMahon

[57] ABSTRACT

This invention relates to an integral multi-compartment combination package and stirrer device. A hollow tubular body is bonded together with end caps and one or more compartment separators are bonded inside the hollow tubular body. A die cut slot in the tubular body forms an opening to each compartment and the contents are contained in the compartments with a tear-away or perforated sealable tab affixed atop of each compartment emptying slot. The user can remove the tab to empty the contents of one or more of the additives into a beverage and then utilize this package itself to stir the additives into a hot or cold beverage. Other conventional opening methods may be used as alternatives to the tear-away tab method.

7 Claims, 11 Drawing Figures

MULTI-COMPARTMENT COMBINATION PACKAGE AND STIRRER DEVICE

SUMMARY AND BACKGROUND OF THE INVENTION

The present invention relates to a multi-compartment combination package and stirrer. This invention relates to the individual service packaging and dispensing of sugar, non-dairy creamer, coffee, tea and the like.

Heretofore, there have been a number of attempts to provide more convenient individual service package and dispensers for sugar, non-dairy creamer, or other flavor additives with coffee, tea or other beverages. These attempts have not been fully successful because individual portion packages of each item was provided, or a satisfactory stirring device was not provided or was provided separately. The cost of portion packaging of these separate items and then wrapping sugar, non-dairy creamer, and stirring device, and the like into a combined single dispensing package has exceeded the convenience feature for nearly all vendors including airlines, restaurants, and carry-out shops.

Other devices which have been proposed to provide a package combined with a functional use such as a straw with an ingredient contained therein have had only a single compartment and were not capable of being used as a stirrer in hot beverages. Such combined type packages were also difficult to open and became soggy and limp after being placed in warm liquid. Further, the cost of providing a combination package into a pouch spoon like device makes this approach competitively unattractive with conventional portion packaging of separate additives and an individual stirrer. Further, this costly approach is not compatible with existing conventional packaging methods and equipment.

An object of this invention is to provide a multi-compartment package which will allow a vendor to separately package sugar and non-dairy creamer or the like, inside the package and which the package itself can be utilized as a stirrer of the additives into either a hot or cold beverage.

A specific object of this invention is to eliminate the necessity of separate individual packages of additives and a stirrer for a single beverage. Another object of the subject invention is to provide a multi-compartment package for which each compartment can be easily opened and drained fully of ingredients.

Another object is to provide a single multi-compartment package for powder, granular, or liquid ingredients and said combined package and stirrer can be manufactured economically and printed at high speeds with a minimum amount of machinery. It is a further object to provide a multi-compartment combination package and stirrer which can be filled and sealed with conventional packaging methods. A further object is to provide a multi-compartment package which, when filled, can itself be efficiently nested and packaged economically in a larger container for mass distribution.

A further unique feature of the present invention is to provide capability to be printed with instructions, advertisements, or the like. It is an object of the present invention to provide a multi-compartment package for which such printing can be accomplished at low cost during in-line manufacture in continuous web form by conventional printing methods at high speeds.

Still a further object to provide a multi-compartment tubular shaped package for which there can be alternative cross sectional shapes to a round tubular design and which the shape and size of the final multi-compartment package can be easily customized to meet the varying needs of packagers. Another object of this invention is to provide a multi-compartment package which can be manufactured economically of alternative materials such as: cardboard, paper, biodegradable paper, heat sealable plastic, thermo plastic; or other suitable and satisfactory materials.

This invention possesses other objects and features of advantage which will become apparent from the following description taken in conjunction with the accompanying drawings.

DETAILED DESCRIPTION

Figure 1:
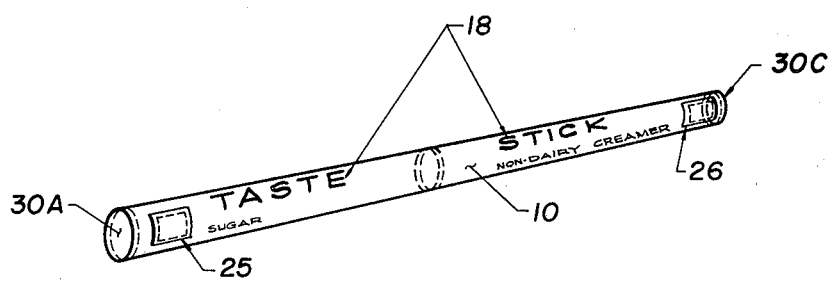
FIG. 1 is a perspective view of the multi-compartment combination package and stirrer constructed in accordance with this invention.

Referring to the drawings for a better understanding of the present invention, as shown in FIG. 1, the multi-compartment combination package and stirrer body 10 is depicted as it is in use with tear-away or perforated opening tabs 25 and 26 located at each end of body 10. End caps 30A and 30C are affixed to each end of tubular package body 10. Advertisement or printed messages 18 may be printed along the tubular package body 10. Similarly, graduations of parts of a teaspoon or the like may be printed along tubular body 10 at the appropriate location for a specific compartment when reference information as to measurement of compartment contents is needed.

Figure 2:
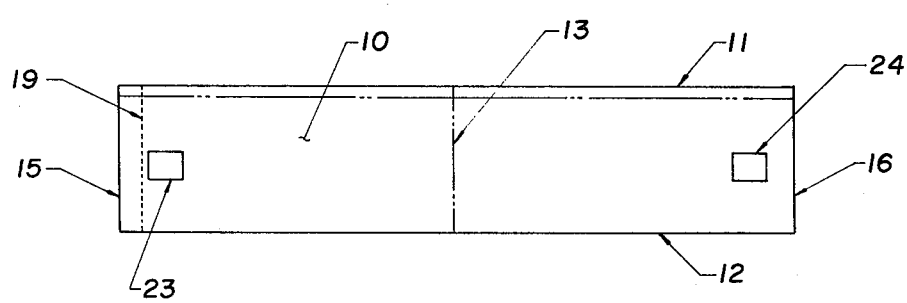
FIG. 2 is a top plan view of a two compartment package body.

As shown in FIG. 2, the multi-compartment package and stirrer body 10 is rolled formed to form a hollow tube-like structure by joining and bonding the inside surface or body edge 12 with the outside surface of body edge 11 with an adhesive material deposited along the length of body edge 11 so an overlap seam is formed along the length of body 10 by body edge 11 and edge 12. Other conventional manufacturing methods may also be used to fabricate tubular body 10.

Compartment emptying slot 23 and 24 are die cut at opposite ends of body 10. The slots may be fully cut away when used with a heat sealable outer tab 25. Slots 23 and 24 may also be die cut with perforated edges when used with a sealable foil tab 25.

Other conventional opening methods may be provided as alternatives to that described above such as scribing a perforated score line 19 or the like on body 10 at the end of a compartment. Perforated score line 19 may be scribed parallel to body edge 15 or 16 so that the perforations do not penetrate the inside surface of body 10 until the user snaps the compartment body at perforated score seam to empty the compartment contents.

Body 10 can be printed as a flat material with conventional printing processes in web form prior to roll forming into a tube.

Figure 3:
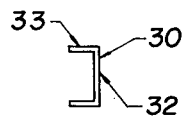
FIG. 3 is a front view of a formed end cap or compartment separator.
Figure 4:
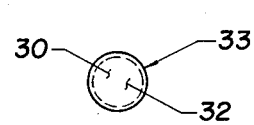
FIG. 4 is a side view of the formed end cap or compartment separator shown in FIG. 3.

As shown in FIGS. 3 and 4, an end cap or compartment separator 30 which is identical is formed to the shape of desired cross section of the multi-compartment combination package and stirrer with flanged lip 33 at a right angle to flat surface 32 protruding around the perimeter of end cap 30. One end cap is required for each end of the package as well as additional compartment separators for the total number of compartments required less one. An adhesive material is applied to the outside surface of flanged lip 33 for bonding end cap or compartment separator 30 to body 10.

Figure 5:
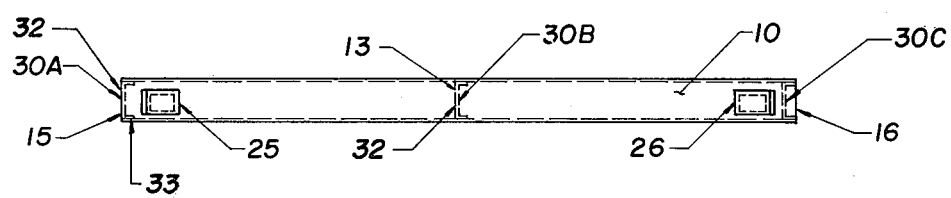
FIG. 5 is a side view of the assembled multi-compartment combination package and stirrer showing two compartments and two opening tabs.

FIG. 5 shows an assembled two compartment combination package and stirrer. End cap 30A is inserted into formed tubular body 10 with flat edges 32 registered precisely even with tubular body edge 15 and is affixed to tubular body 10 with lip 33 having an adhesive material around the perimeter. Compartment separator 30B is similarly inserted and registered to imaginary line 13 scribed around tubular body 10 precisely one-half the distance from body edge 15 to body edge 16 with flat edge 32 of compartment separator 30B parallel to flat edge 32 of end cap 30A. End cap 30C is inserted into formed tubular body 10 with flat edge 32 parallel to flat edge 32 of compartment separator 30B with the bottom of lip 33 registered precisely with tubular body edge 16 and affixed in a similar manner to tubular body 10 with an adhesive material.

FIG. 5 also shows compartment opening tabs 25 and 26 located at the extreme ends of each compartment formed in tubular body 10. The perforated or tear-away tabs allow the use to empty one or more of the additives. In normal use, removable sealable tabs 25 and 26 are added to the multi-compartment package and stirrer after the compartments have been filled with additives. The sealable tabs prevent leakage or air penetration. One tear-away sealable tab is required for each separate compartment of the combination package and stirrer. Other conventional opening methods described above may be used as alternatives to the herein tab opening method described.

Figure 6:
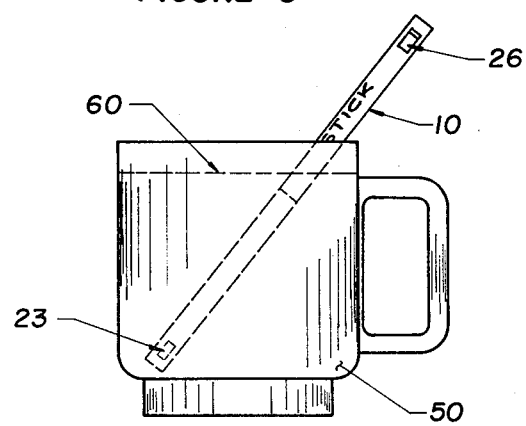
FIG. 6 is a perspective view of the combination package and stirrer showing the invention in use in stirring an additive into a hot beverage in a cup.

As shown in FIG. 6, the user may empty a compartment containing separate ingredients by removing the tear-away tab 25 and allowing the ingredient to pour out through emptying slot 23. Tubular body 10 of the combination package and stirrer can be utilized to stir the additive into the hot or cold beverage 60 inside of a cup 50 or other suitable container.

Figure 7:
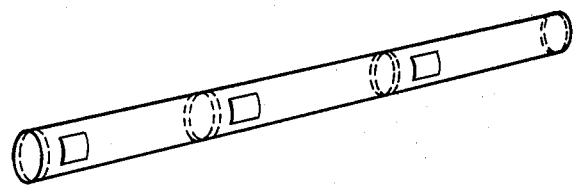
FIG. 7 is a cutaway perspective view of the combination package and stirrer showing a three compartment package body.
Figure 8:
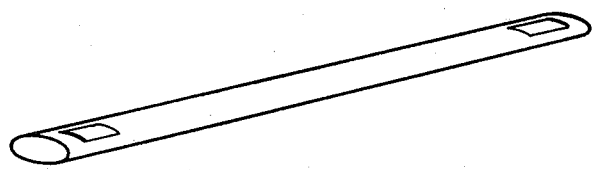
FIGS. 8 to 11 are perspective views of the multi-compartment combination package and stirrer illustrating alternative cross sectional shapes of the container constructed in accordance with this invention.
Figure 9:
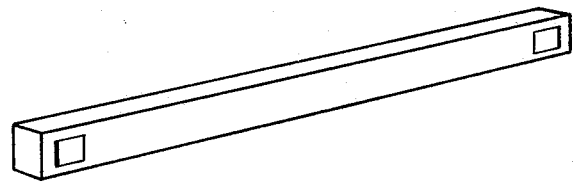
Figure 10:
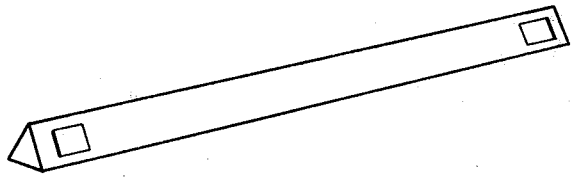
Figure 11:
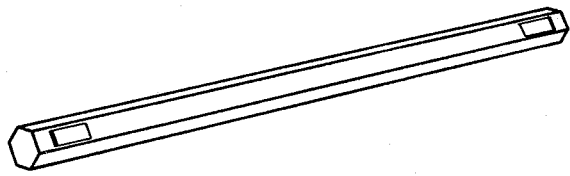

FIG. 7 depicts a combination package and stirrer in which there are three separate compartments for three additives. The structure of this package can similarly be adapted for more than three compartments such as for use in combining two distinct blends of a beverage with a compartment for an artificial sweetner, a compartment for sugar, and a compartment for a non-dairy creamer. The size of each compartment can be controlled for proper volume of additive to be contained therein by the cross sectional area of the package and by positioning of compartment separators 30 as illustrated in FIG. 5.

Tubular body 10 may be constructed of cardboard, paper, or plastic material but is preferably constructed of biodegradable paper coated on one surface with a moisture barrier material and for which the moisture barrier coating does not liquify at temperatures below 220° F. The preferred method of fabrication is roll forming of the tubular body and press forming of die cut end caps.

FIGS. 8 through 11 depict multi-compartment combination package and stirrers with alternative cross sectional shapes constructed in accordance with this invention. It is observed from these figures that the cross sectional shape of the finished combination container and stirrer is largely controlled by the shape of the formed end cap or compartment separator 30 used in fabricating the specific package. The proper volume of each compartment is controlled by the size of cross section area and internal placement of compartment separators.

Because other variations, sizes, shapes, changes and modifications may be made to the embodiments described, it is intended that all matters in the foregoing description be interpreted as illustrative and not as limitations of my invention or the scope of the appended claims.

What I claim as new and desire to secure by Letters of Patent of the United States is:

1. An integral multi-compartment combination package and stirrer device of flexible material comprising:
A hollow tubular body having opposed elongated sides bonded together to form said tubular body,
two end caps each having the cross sectional shape of the finished combination package and stirrer device with a flanged lip around the perimeter at a right angle to the flat surface of said end cap,
one or more compartment separators similar to said end cap,
one said end cap inserted into said tubular body with end cap positioned with flat surface of end cap at right angle to long axis of said tubular body with outside surfaces of flanged lip of said end cap bonded to inside surface of said tubular body at one end or tubular body,
said compartment separators inserted into said tubular body with compartment separators positioned with flat surface of compartment separators at right angle to long axis of said tubular body with outside surface flanged lip of said compartment separators bonded to inside surface of said tubular body at a distance from first bonded end cap to form a compartment within the said tubular body,
second end cap inserted into tubular body at remaining open end of said tubular body and affixed to tubular body indentical to first bonded end cap,
said hollow tubular body having a die cut slot removed or perforated compartment emptying slot cut at one end of each compartment formed in said tubular body for removal of compartment contents,
perforated or tear-away sealable tabs affixed atop of each said compartment emptying slot and said tabs are removable from said tubular body to empty contents of compartment.

2. A multi-compartment combination package and stirrer device as claimed in claim 1 wherein one or more additional compartment separators are inserted and bonded into said tubular body at a further distance from the first bonded compartment separator to form additional compartments within the said tubular body.

3. A multicompartment combination package and stirrer device as claimed in claim 1 or claim 2 wherein the cross sectional shape of the said end caps, compartment separators, and finished combination package and stirrer can alternatively be triangular, rectangular, octagonal, oval, or the like geometrical shapes.

4. A multi-comlpartment combination package and stirrer device as claimed in claim 1 which includes a thin layer of a moisture barrier high heat coating to the inside surface of the said tubular body and upon said end caps and upon both surfaces of said compartment separators to provide fluid tight compartments.

5. A multi-compartment combination package and stirrer device as claimed in claim 1 and 4 wherein the said flexible material is biodegradable paper.

6. A multi-compartment combination package and stirrer device as claimed in claim 1 wherein the said flexible material is a thermo plastic material and said adhesive contains a resin activated by heat.

7. A multi-compartment combination package and stirrer device as claimed in claim 1 wherein any conventional tubular opening method may be used as alternative to the tab opening method described.

* * * * *